(12) United States Patent
Wolf et al.

(10) Patent No.: US 7,567,988 B2
(45) Date of Patent: Jul. 28, 2009

(54) SYNCHRONIZING AGENT FOR MULTIPLE CLIENTS/APPLICATIONS ON A COMPUTER SYSTEM

(75) Inventors: Werner G. Wolf, Wiesloch (DE); David L. Sacks, Bedford, NH (US)

(73) Assignee: SAP AG, Walldorf (DE)

( * ) Notice: Subject to any disclaimer, the term of this patent is extended or adjusted under 35 U.S.C. 154(b) by 436 days.

(21) Appl. No.: 10/900,291

(22) Filed: Jul. 28, 2004

(65) Prior Publication Data

US 2006/0015539 A1    Jan. 19, 2006

Related U.S. Application Data

(60) Provisional application No. 60/588,394, filed on Jul. 16, 2004.

(51) Int. Cl.
*G06F 17/30*    (2006.01)
*G06F 7/00*    (2006.01)
(52) U.S. Cl. ............................ 707/201; 707/100; 707/3
(58) Field of Classification Search .................. 707/201
See application file for complete search history.

(56) References Cited

U.S. PATENT DOCUMENTS

| | | | | |
|---|---|---|---|---|
| 5,519,606 A | * | 5/1996 | Frid-Nielsen et al. .......... 705/9 |
| 5,758,355 A | * | 5/1998 | Buchanan .................... 707/201 |
| 6,295,541 B1 | * | 9/2001 | Bodnar et al. ............... 707/203 |
| 6,553,037 B1 | * | 4/2003 | Pivowar et al. .............. 370/463 |
| 6,601,076 B1 | * | 7/2003 | McCaw et al. .............. 707/203 |
| 2002/0059375 A1 | * | 5/2002 | Pivowar et al. .............. 709/204 |
| 2005/0044165 A1 | * | 2/2005 | O'Farrell et al. ............ 709/213 |
| 2005/0177617 A1 | * | 8/2005 | Banginwar et al. .......... 709/203 |

* cited by examiner

*Primary Examiner*—Kuen Lu
*Assistant Examiner*—Binh V Ho
(74) *Attorney, Agent, or Firm*—Kenyon & Kenyon LLP

(57) ABSTRACT

A suite of features for use by a synchronization agent to synchronize data records among two or more clients. Some of the embodiments enhance conventional synchronization features by providing customizable response of a synchronization agent to an operator's needs. For example, conditions may be defined that permit various client records to be synchronized according to policies that differ from default synchronization policies. Different synchronization policies may be triggered by the content of data records or by the clients from which the records originate. Other features may cause automatic population of fields within data records or resolution of synchronization conflicts.

17 Claims, 10 Drawing Sheets

100

200

300

500

600

800

900

1000

1100

1200

1400

SYNCHRONIZING AGENT FOR MULTIPLE CLIENTS/APPLICATIONS ON A COMPUTER SYSTEM

CROSS-REFERENCE TO RELATED APPLICATION

This application claims the benefit of priority afforded by provisional application Ser. No. 60/588,394 filed Jul. 16, 2004.

BACKGROUND

The present invention relates to data synchronization agents for use in computer systems.

Modern computer users often find that they are required to store copies of redundant data on multiple clients. For example, an operator may maintain personal scheduling information, contacts and lists of action items on both a desktop computer and a portable personal digital assistant. Moreover, operators may maintain such data on personal information managers (e.g., Microsoft's Outlook, Lotus Notes, among others) and also centralized enterprise resource planning applications such as SAP's R/3 application. To relieve operators from having to enter common data records multiple times for multiple applications (herein, "clients"), synchronization agents can be used.

Herein, a "synchronization agent" refers to a body of applications that synchronize data records among multiple clients. PalmSource, Inc.'s HotSync application and PumaTech Corporation's Intellisync suite of applications are examples of such synchronization agents. Known synchronization agents adequately synchronize data records among a pair of clients but they are unwieldy in many aspects. Known synchronization agents tend to provide a single synchronization solution for all users or to permit operators to specify different synchronization rules on a very coarse scale (e.g., calendar items synchronized in one fashion and contacts items specified in another fashion). They do not, however, permit operators to customize operation of the synchronization agent along parameters that are critical to the operators' use of the data records. For example, known synchronization agents do not permit operators to:

- specify different synchronization rules based on client codes, contact names or company names;
- restrict synchronization operations to single records, to records that meet a predetermined date restriction, or to tasks records that are open; and
- resolve synchronization conflicts on a field-by-field basis and on a sweeping basis at the same time.

Accordingly, the present inventors perceive these and other needs in the art.

DETAILED DESCRIPTION

As described herein, the inventors propose a suite of synchronization features for use by a synchronization agent. Some of the embodiments enhance conventional synchronization features by providing customizable response of a synchronization agent to an operator's needs. For example, different synchronization operations may be defined based upon the content of data records themselves, by records' time of creation or editing or by records' status.

Figure 1:
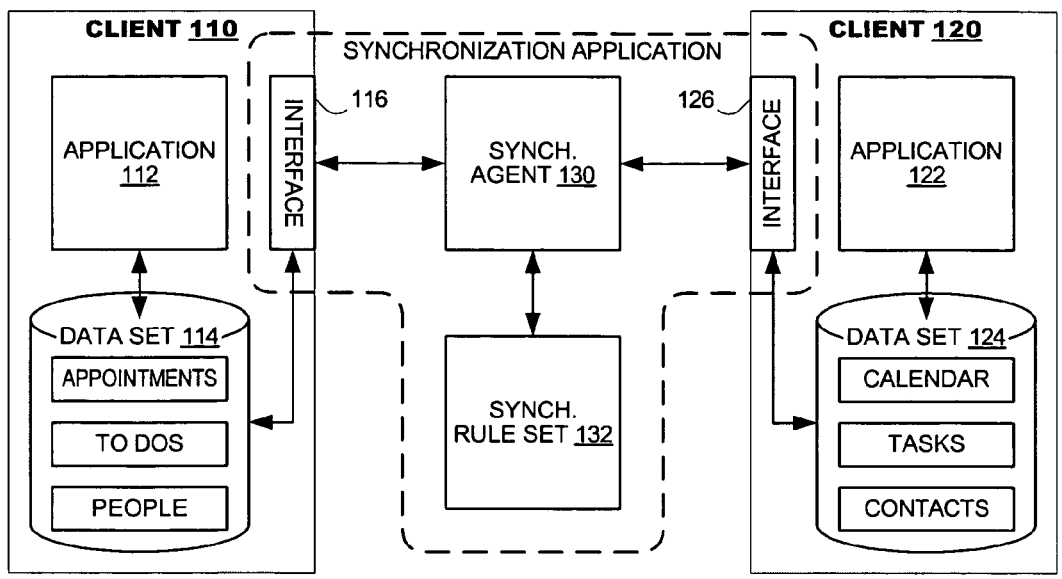
FIG. 1 is a simplified block diagram of a synchronization application in a computer system, according to an embodiment of the present invention.

FIG. 1 is a simplified block diagram of a synchronization application in a computer system 100. The system 100 may include a pair of clients 110, 120. Each client includes one or more applications 112, 122 and various data sets 114, 124. The system 100 of FIG. 1 applies to systems in which the clients 110, 120 are different, discrete hardware systems (e.g., terminal and server, PDA and terminal) and also to systems in which the clients 110, 120 are different applications operating on a common hardware platform (e.g., Microsoft's Outlook and SAP's R/3 applications). Unless otherwise indicated herein, the principles of the present invention apply equally as well to both embodiments.

The system 100 also includes a synchronization agent 130, an application that manages synchronization of data records between the clients 110, 120. Typically, each client 110, 120 includes an appropriate interface 116, 126 through which the client recognizes synchronization operations from the synchronization agent 130. When activated, the synchronization agent 130 reviews records from various data sets 114, 124 of the clients to determine whether the data records on each client should be copied to the other client to keep them current. In this regard, the architecture and operation of synchronization systems 100 is well known.

According to an embodiment of the present invention, a synchronization agent 130 applies different synchronization rules to different records stored in the datasets 114, 124 of the clients 110, 120. In such an embodiment, synchronization options are determined from fields of the data records themselves. For example, different synchronization options may be applied based on a company name, a billing code, a project code or a categories field provided within such records. Synchronization options would be defined in a synchronization rule set 132 defined for the synchronization agent 130.

Figure 2:
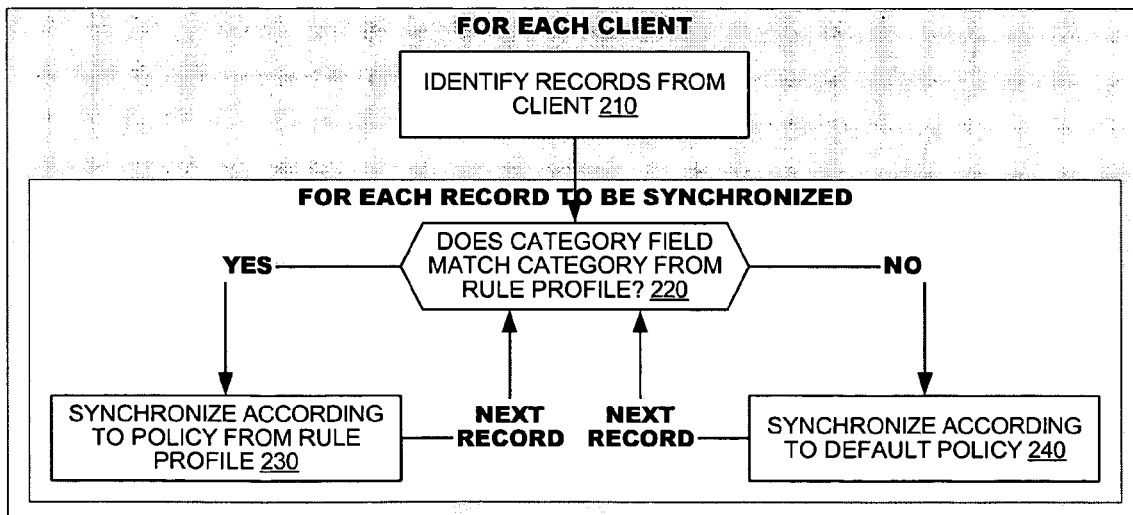
FIG. 2 illustrates a method according to an embodiment of the present invention.

FIG. 2 illustrates a method of operation 200 according to one such embodiment. The method considers data records of each client iteratively. For each client, the method 200 identifies data records that are to be synchronized (box 210). Each record is compared against a rule profile that defines rules to be applied to the data records and determines whether a match occurs (box 220). If so, synchronization occurs as defined in the matching rule (box 230). Otherwise, synchronization occurs according to a default rule (box 240). The method may be repeated for as many data records on the clients as are to be synchronized.

TABLE 1

| RULE | CONDITION | SYNCHRONIZATION POLICY |
|---|---|---|
| 1 | Company Name = "XYZ Corp." | Client 110 records overwrite client 120 records; Flag conflicts for resolution. |
| 2 | Company Name = "ABC Inc." | Client 120 records overwrite client 110 records, regardless of conflicts. |
| 3 | Category = "Firm" | Client 110 records cannot be overwritten. Conflicts with client 120 records cause duplicates to be created at client 110. |
| 4 | Category = "Personal" | Do not synchronize records. |
| Default | | Synchronize; flag conflicts for resolution. |

Table 1 illustrates an exemplary synchronization rule set with four rules. In this embodiment, two rules are conditioned on company name. The third and fourth rules are based on a field called "category." Different synchronization policies are defined therein. Any data records that matches the condition(s) specified in a rule will be synchronized as defined in the corresponding synchronization policy. Data records that miss conditions of all rules may be synchronized according to a default rule. In an embodiment, data records that match conditions of multiple rules may be flagged to a system operator for resolution. Alternatively, the rules may include a priority indicator that specifies which rules take precedence over other rules.

As noted, various fields in client datasets 114, 124 may support rule conditions. Typically, conditions will be based on client names, client codes, project codes, matter numbers, account owners and status indicators such as open/closed indicators. Such examples are not meant to be limiting. Indeed, any field supported by the Microsoft Outlook field template may be included as a condition in a rule set.

Table 1, of course, provides a simple example of a rule set. The present invention includes more complicated definitions of conditions and accommodates, for example, common Boolean operators (AND, OR, NOT) to build conditions from combinations of multiple fields.

Another embodiment provides a technique for managing conflicts among data records stored by multiple clients 110, 120. According to an embodiment, when a synchronization conflict occurs, data representing conflicting data records are displayed and an operator is permitted to identify which fields from the data records are to be retained for synchronization.

Figure 3:
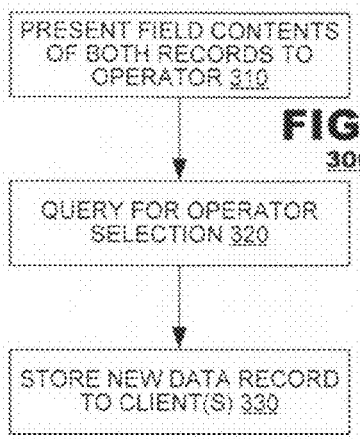
FIG. 3 illustrates a method according to another embodiment of the present invention.

FIG. 3 illustrates a method 300 according to an embodiment of the present invention. According to the method, when synchronization occurs and a conflict is identified between data records on multiple clients, the method 300 displays field contents of the conflicting records (box 310). The method 300 queries an operator to select fields that contain proper data values for synchronization (box 320) and, in response to the operator's selection, generates a new record that is used for synchronization (box 330).

Figure 4:
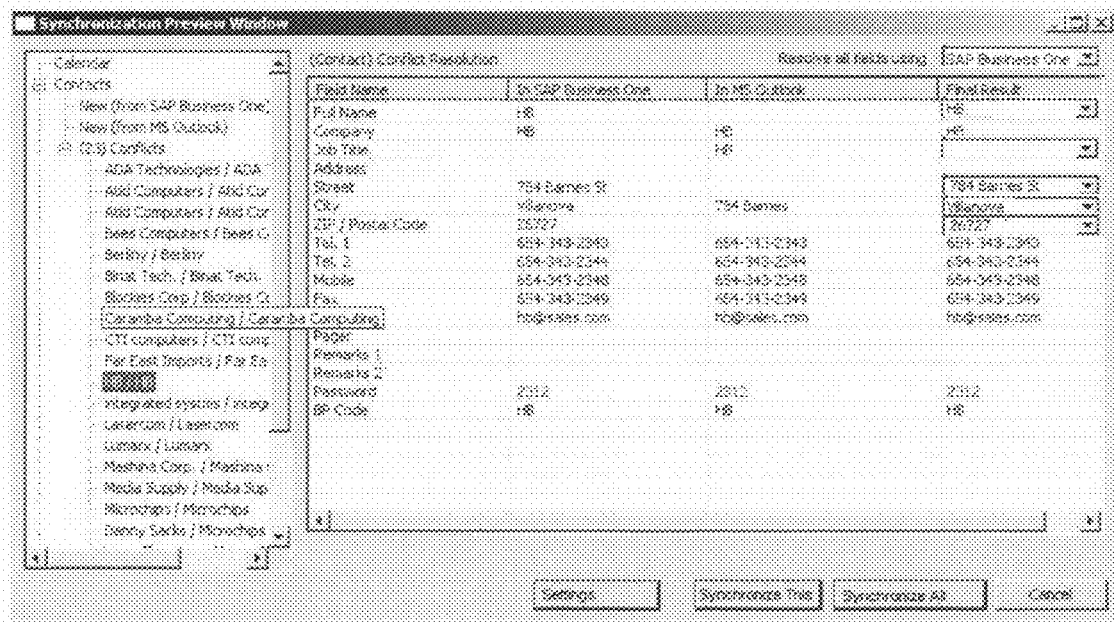
FIG. 4 is a screen shot illustrating an exemplary dialog box that permits conflict resolution according to an embodiment of the present invention.

FIG. 4 is a screen shot illustrating an exemplary dialog box that presents conflicting records for resolution. Table 2 illustrates exemplary data that might be presented by a pair of conflicting data records. In the foregoing embodiment, the dialog box might present data as illustrated in the columns labeled "client 1" and client 2" of Table 2. An operator may identify fields that possess correct data as shown in the "selection" column. The operator's selections may generate a final record that is unique compared to the data records stored by each client. This final record can be used as a basis for further synchronization. For example, the final record may be stored at both clients.

TABLE 2

| | CLIENT 1 | CLIENT 2 | OPERATOR'S SELECTION | FINAL RECORD |
|---|---|---|---|---|
| Full Name | Joe Smith | Joseph E. Smith | Client 2 | Joseph E. Smith |
| Company | ABC Corp. | ABC Corp. | No Conflict | ABC Corp. |
| Job Title | VP, Engineering | VP | Client 1 | VP, Engineering |
| Address | 1500 Main Street | 1500 Main Street, Suite 500 | Client 2 | 1500 Main Street, Suite 500 |
| City | Springfield | Springfield | No Conflict | Springfield |
| ZIP/Postal Code | 12345 | 12345 | No Conflict | 12345 |

Another embodiment of the present invention provides a "synchronize this" feature for a client application. In the embodiment, as an operator browses through data records of a client application, the operator may generate a command to synchronize a single data record currently being viewed. This embodiment prevents the synchronizing agent from having to survey all data records in a dataset to determine which records need to be synchronized. Accordingly, the speed of the synchronization operation is improved.

Figure 5:
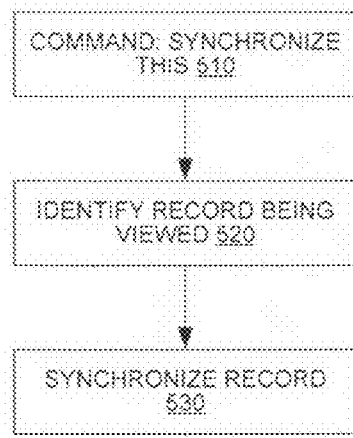
FIG. 5 illustrates another method according to an embodiment of the present invention.

FIG. 5 is a flow diagram of another method 500 according to an embodiment of the present invention. According to the method, when an operator enters a "synchronize this" command (box 510), the method 500 identifies a data record that currently is being viewed through the client application (box 520). The method 500 synchronizes the current record and no others (box 530). Thereafter, the method terminates.

In an embodiment, the synchronize this command may be entered via an icon embedded in the client application. Many applications, such as Microsoft Outlook for example, provide software tools to permit other software vendors to embed icons in the graphical user interfaces of their applications. Thus, the command may be entered via a toolbar or icon set that is integrated into the client application itself (e.g., Microsoft Outlook, SAP R/3) or, alternatively, it may be entered through the client's operation system. In either case, the command causes an application to determine which record is being viewed currently and synchronizes the record itself.

Figure 6:
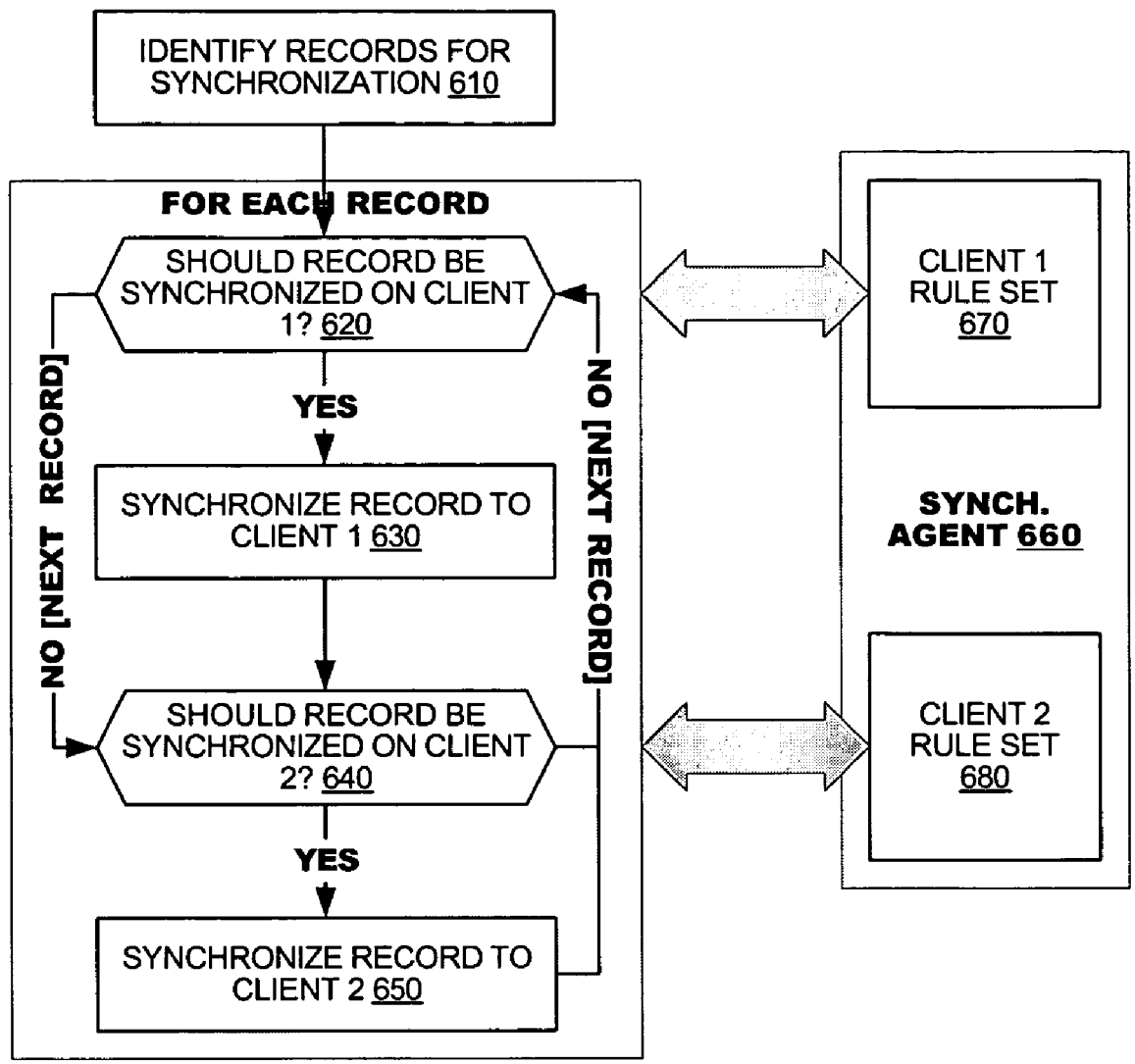
FIG. 6 illustrates a method according to another embodiment of the present invention.

FIG. 6 illustrates another synchronization method 600 according to an embodiment of the present invention. This embodiment permits operators to specify unique synchronization rule sets for each client undergoing synchronization. According to an embodiment, synchronization begins by identifying records that are to be synchronized (box 610). Thereafter, for each record, the method 600 determines whether the respective record should be synchronized on the first client (box 620). If so, the record is stored to the first client (box 630). The method 600 also determines whether the record should be synchronized on the second client (box 640) and, if so, it stores the record to the second client (box 650). The operations of boxes 640 and 650 may be repeated for as many clients are subject to synchronization.

Operation of the foregoing method may be facilitated by a synchronization agent 660 that stores rule sets 670, 680 for each of the clients subject to synchronization. The rule sets 670, 680 may specify, for example, that records are to be copied to the client, may not be copied to the client or shall be copied to the client only if defined conditions are met.

Figure 7:
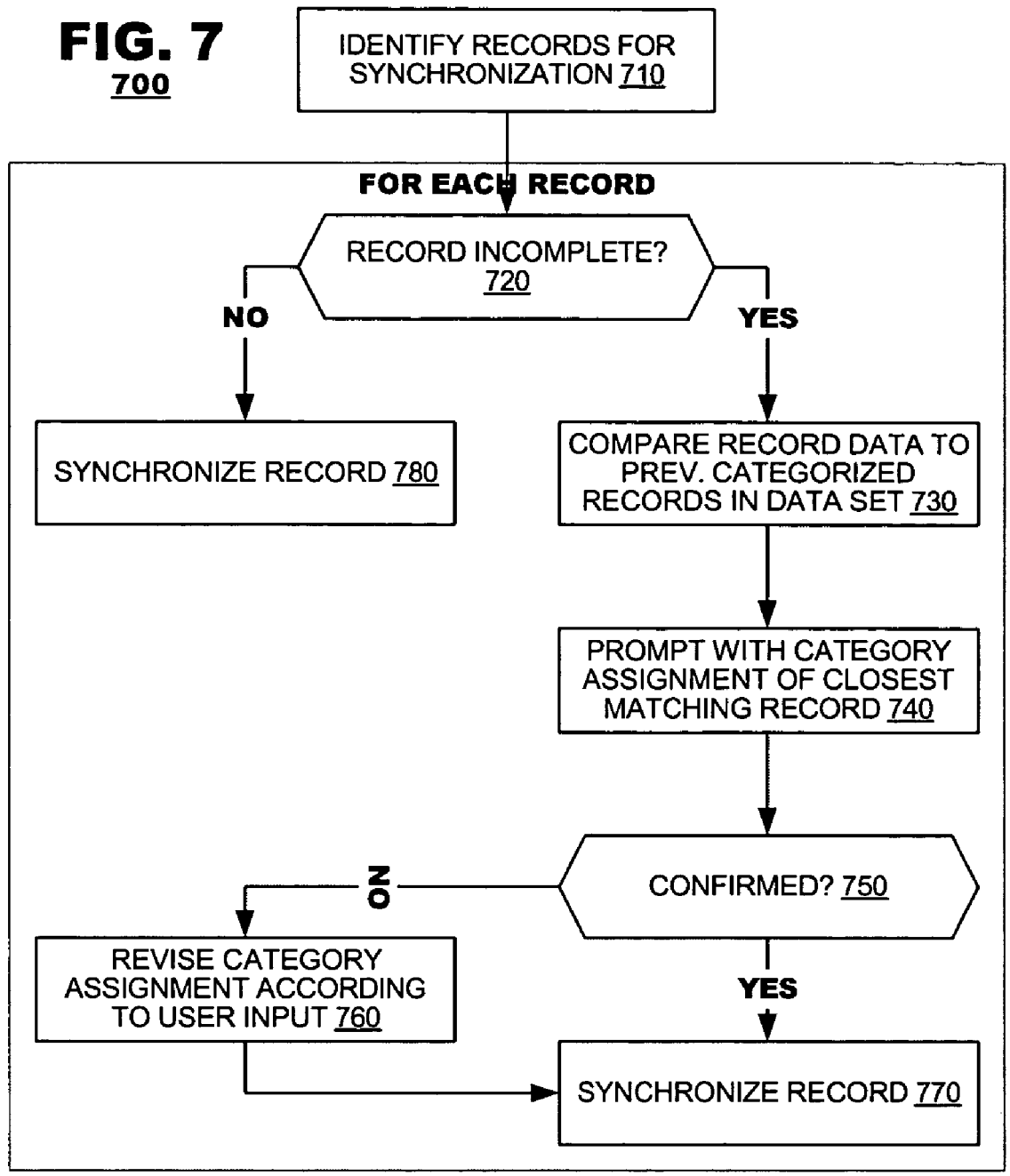
FIG. 7 illustrates a method according to a further embodiment of the present invention.

FIG. 7 illustrates a synchronization method 700 according to a further embodiment of the present invention. In this embodiment, the method 700 identifies incomplete data records and, with reference to other data records previously stored by the clients, proposes data to supplement data of the incomplete data record. The method 700 may begin by identifying records that are to be synchronized (box 710). For each record, the method determines whether the record is incomplete (box 720). If so, the method 700 may survey data sets of the various clients to compare completed fields of the record being synchronized against other data records stored by the clients (box 730). Based on a match, the method 700 may prompt the operator to complete of the record being synchronized, providing data culled from one or more other records (box 740). An operator may respond by accepting the proposed data, by overwriting the proposal (box 760) or by indicating that the record shall be stored in its incomplete form. The method 700 synchronizes the data records as indicated by the operator (box 770).

Of course, the operations of boxes 730-760 need not be performed for a data record that is identified as complete. Instead, synchronization may be performed directly upon a complete data record (box 780).

Figure 8:
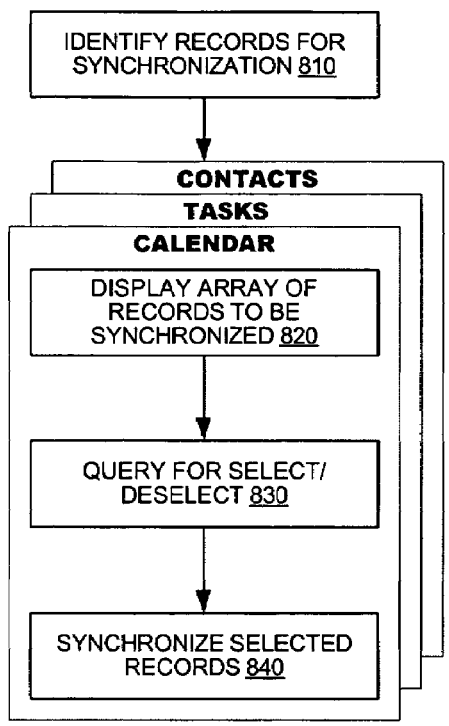
FIG. 8 illustrates a method according to another embodiment of the present invention.

FIG. 8 illustrates another method 800 according to embodiment of the present invention. According to this embodiment, after candidate records are identified but before synchronization occurs, the method 800 identifies the candidate records to an operator and permits the operator to select or de-select records from the remainder of the synchronization operation. According to the method 800, when a synchronization operation begins, the method identifies client records to be synchronized (box 810). Record identification may occur by any conventional process. Thereafter and before new data is written to client data sets, the method 800 generates a display that identifies records to be synchronized (box 820). The method 800 queries an operator to select or deselect records for synchronization (box 830). Thereafter, conventional synchronization is performed but it is limited to the records selected by an operator (box 840).

Figure 9:
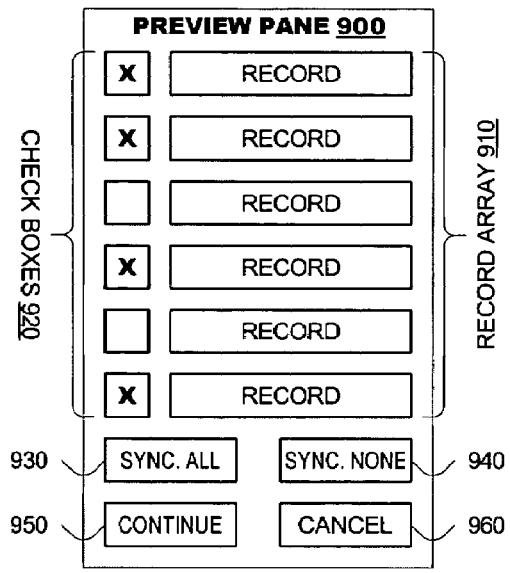
FIG. 9 illustrates an exemplary preview pane according to an embodiment of the present invention.

FIG. 9 illustrates an exemplary preview pane 900 that is consistent with the embodiment of FIG. 8. The FIG. 9 includes a record array 910, which identifies contents of several records that are identified as candidates for synchronization. The preview pane 900 also includes check boxes 920, one corresponding to each record 910 to permit an operator to select or de-select individual records. The preview pane 900 also may include a number of ancillary navigation buttons, for example "synchronize all" 930, "synchronize none" 940, "continue" 950 and "cancel" 960, to permit other navigation and selection options. Of course, the present invention finds application with displays having different layouts than are shown in FIG. 9.

In an embodiment, the preview pane of FIG. 9 may display records of different types at different stages of the display. That is, a first preview pane may display calendar records for synchronization first and permit an operator to review, select/de-select and synchronize those records. Thereafter, a new preview pane may present tasks items. Following synchronization of the tasks items, another preview pane may present contacts items. This staggered preview mode is illustrated schematically by the bounding boxes of FIG. 8.

Figure 10:
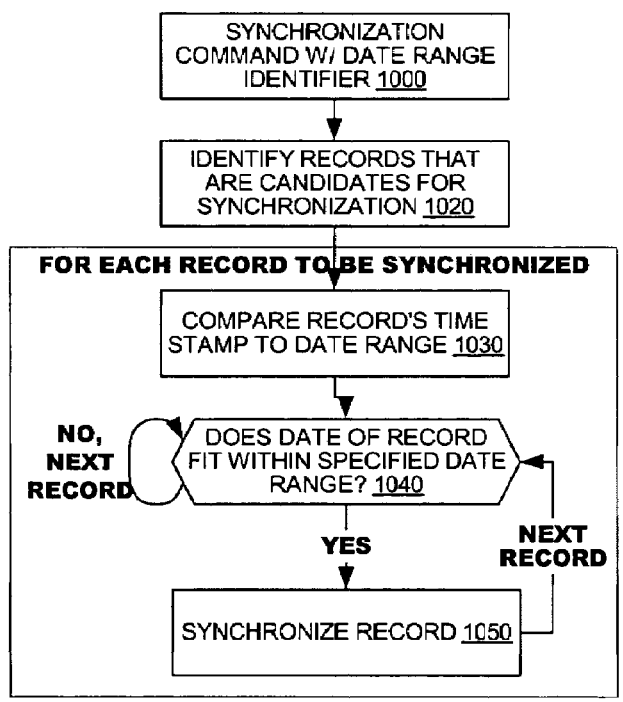
FIG. 10 illustrates a method according to a further embodiment of the present invention.

FIG. 10 illustrates a method 1000 according to another embodiment of the present invention. This embodiment permits an operator to limit a synchronization operation to data records that match a data range identifier entered by the operator. In the embodiment, the method 1000 begins upon receipt of a synchronization command that includes a date range identifier (box 1010). The method 1000 identifies records from each client data set that are candidates for synchronization (box 1020). This initial identification process may occur according to conventional processes. Prior to synchronizing individual data records, the method may compare a time stamp of the record to a data range identified as part of the synchronization command (box 1030). If the time stamp falls within the specified date range, the record is synchronized, again, according to conventional processes (boxes 1040, 1050). If not, synchronization is not performed and the method may advance to the next record.

Figure 11:
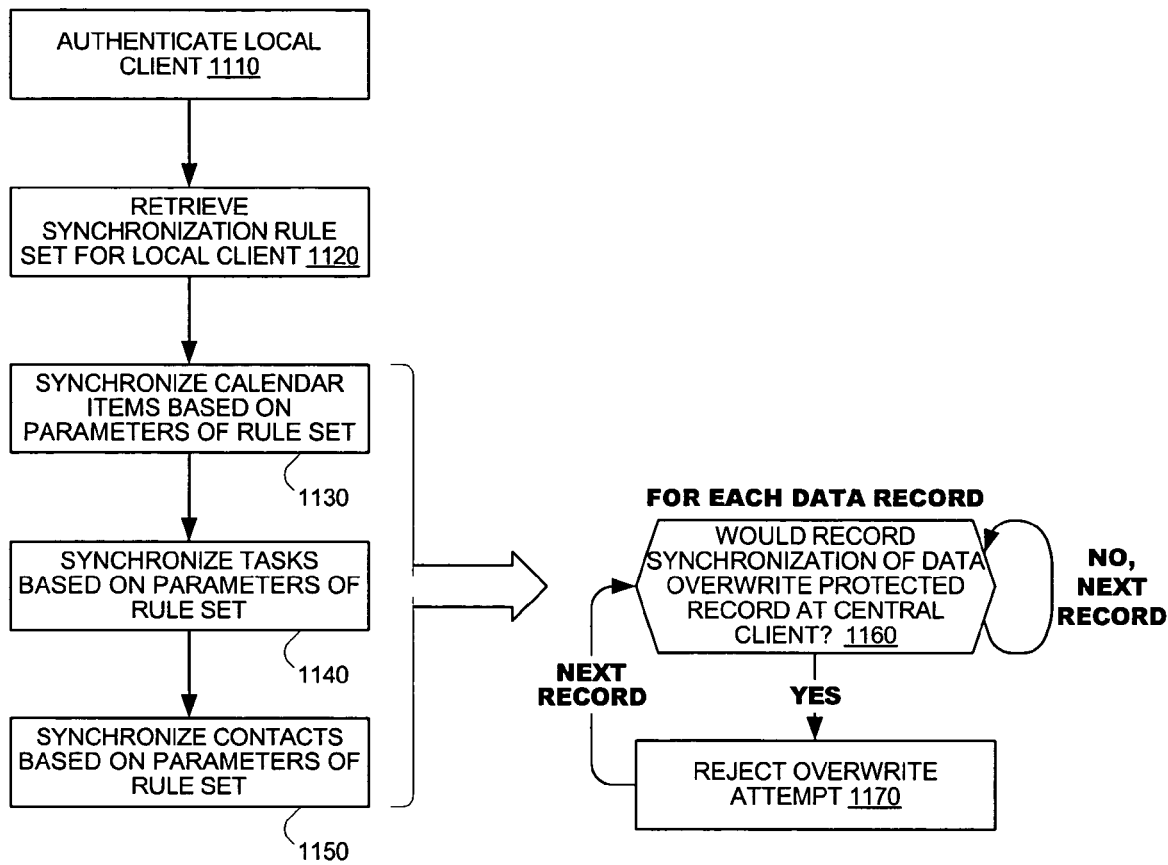
FIG. 11 illustrates another method according to a n embodiment of the present invention.

FIG. 11 illustrates another method 1100 according to an embodiment of the present invention. In certain scenarios, a synchronization agent may support synchronization between a central client (say, a server) and a number of other 'local' clients such as notebook PCs deployed among a firm's sales force. In the embodiment, each 'local' client may synchronize its data records to the central client according to rules that are defined uniquely for the local client. In other words, different local clients may define different synchronization operations with the same central client.

According to the embodiment, when a synchronization command is entered, the method 1100 may authenticate the local client (box 1110) to determine which client is engaged with the central client. Thereafter, the method 1100 may retrieve a synchronization rule set that is specific to the local client (box 1120). The method 1100 continues by synchronizing data records (e.g., calendar items, tasks and contacts) as determined by the synchronization rules (boxes 1130-1150). For each data records, the method 1100 determines whether synchronization of the record would cause writeprotected records at the central client to be over-written (box 1160). If so, the record is not synchronized (box 1170). This scheme prevents protected data records at the central client, which perhaps could be amended at one or more local client sites, from becoming corrupted.

In another embodiment, the present invention may use links established among records of a first client to automatically populate data of corresponding records at a second client. This embodiment finds application, for example, in SAP's Customer Relationship Management ("CRM") applications and elsewhere, where all records are required to be associated with a business partner. That is, records include a business partner field that is a "critical field," it must be completed for the record to be admitted to the application. In some installations, however, new records may be admitted to other clients (e.g., a personal information manager) that either do not support the critical field or do not require that the critical field be completed before the record is admitted to the other client. Synchronization between the two clients, the CRM application and the personal information manager, may cause a conflict in data management policies.

Figure 12:
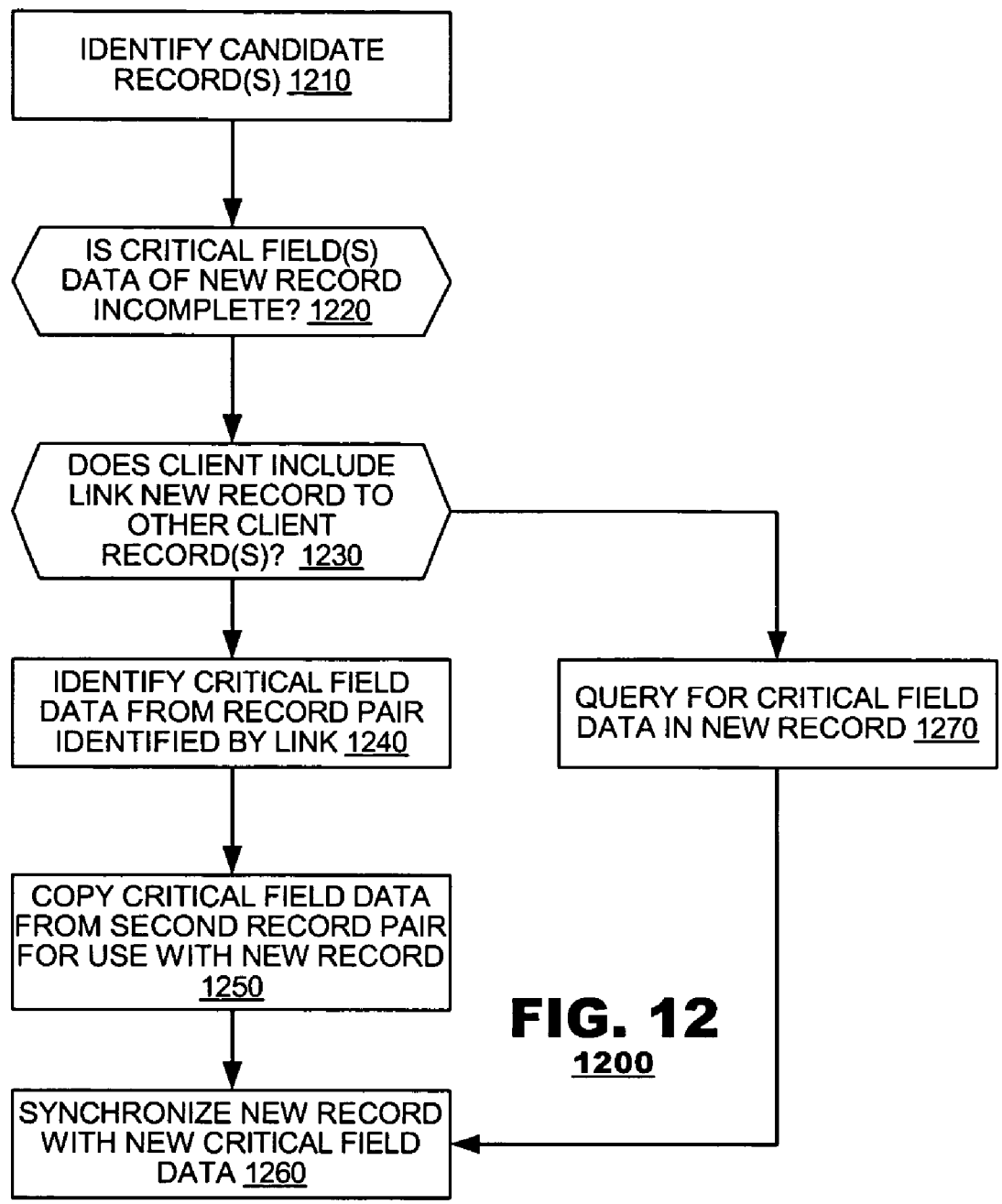
FIG. 12 is a method according to an embodiment of the present invention.

According to an embodiment, a synchronization agent may resolve a conflict by examining links established between records of a client and populating missing critical field data in a new record by using corresponding data from a previously admitted record. FIG. 12 is a method according to the embodiment. The method may begin by identifying all records on a first client that are candidates for synchronization (box 1210). The method determines whether critical field data in a candidate record is incomplete (box 1220). If so, the method 1200 further determines whether the candidate record is linked expressly to other records stored by the same client (box 1230). If so, the method may identify critical field data from the linked record for use with the candidate record (box 1240). The critical field data may be stored in the record on the same client from which the candidate record originated (e.g., the personal information manager in the example above) or from a record on the second client (e.g., the CRM application) corresponding to the linked record. Having identified the critical field data from the linked record, it may be copied to the new record or otherwise used for admitting a new record to the second client (box 1250). Thereafter, the synchronization operation may progress to completion (box 1260). Of course, if no linked records are found, the method 1200 may query an operator for the missing data (box 1270).

Figure 13A:
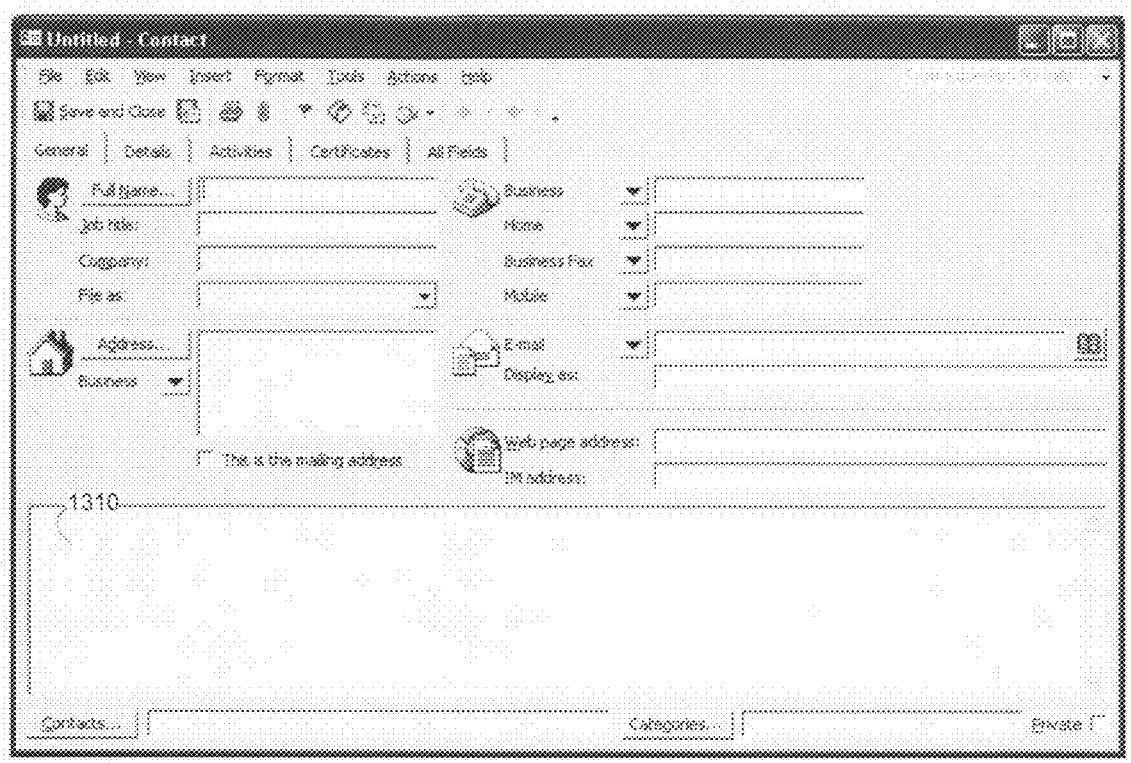
FIGS. 13(a) and 13(b) illustrate examples of linking data for use with embodiments of the present invention.
Figure 13B:
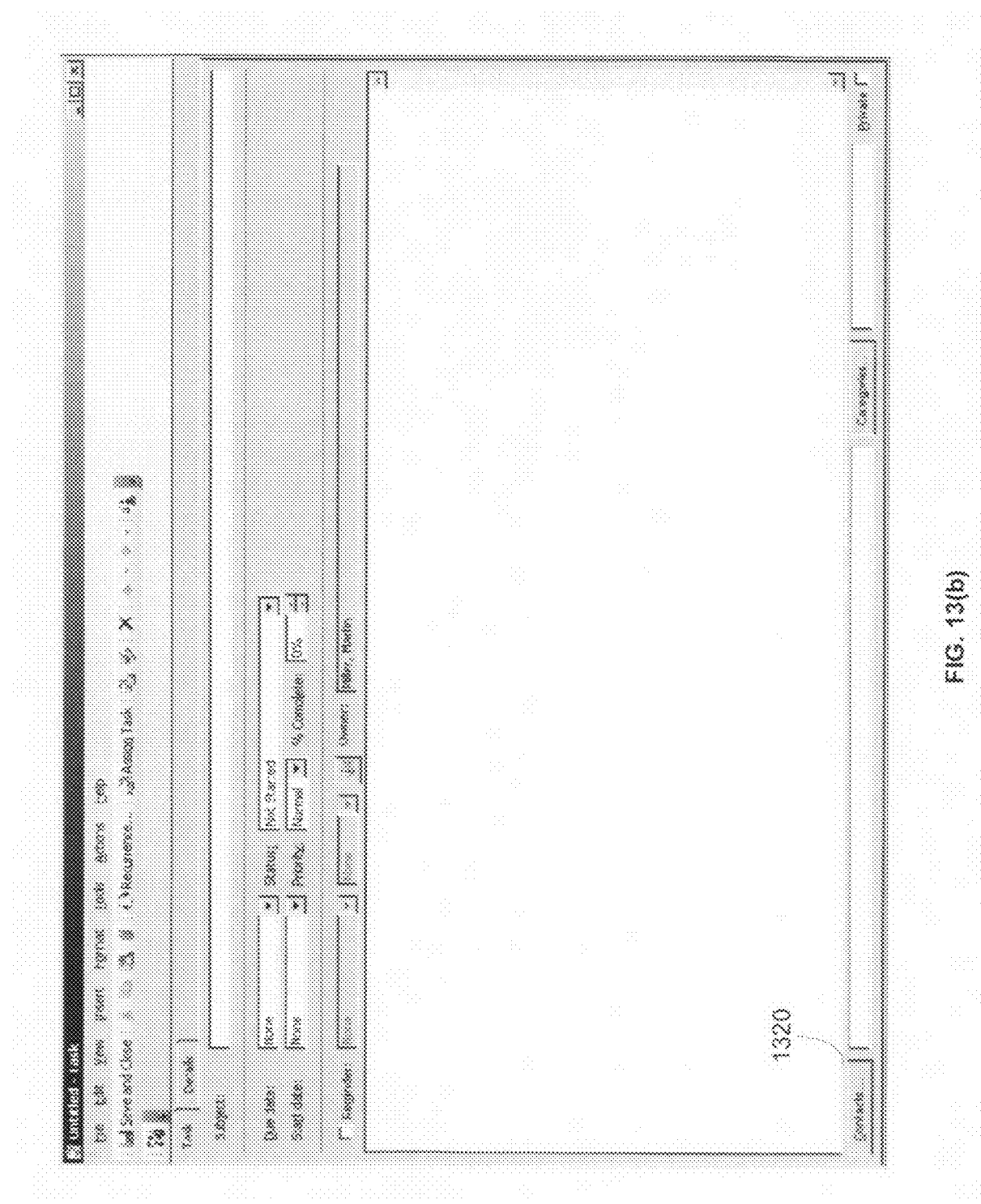

FIGS. 13(a) and 13(b) illustrate examples of linking data supported by the Microsoft Outlook application. FIG. 13(a) is a screen short of a contacts record and FIG. 13(b) is a screen shot of a task record. Both records include a "contacts" field that, when activated, permit an operator to indicate that the record is associated with another record stored by the application. For example, an operator could identify a link between contacts records for Werner Wolf and David Sacks. Having determined during a synchronization operation that critical field data is not provided for the Werner Wolf record, a synchronization agent may follow the link to the David Sacks record and, if critical field data is available, the synchronization agent may copy the data for use during a synchronization operation in which the Werner Wolf record is copied to another client application. Other applications may support links among records in other ways.

In additional to population of critical field data of records, a synchronization agent may populate other record fields by traversing these links as well. Accordingly, if the synchronization agent determined that an address field or a company name field were incomplete, the synchronization agent could copy such information from a linked record. Of course, in all of the foregoing embodiments, the synchronization agent may query an operator to confirm copied data prior to completing the synchronization operation.

Figure 14:
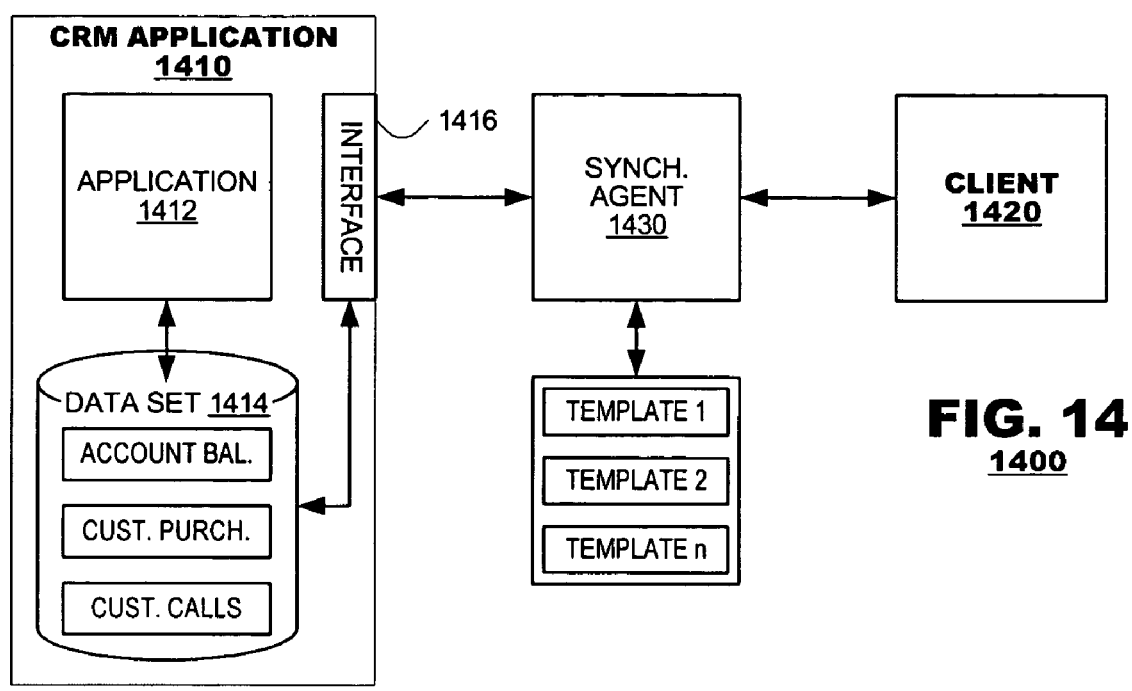
FIG. 14 illustrates an exemplary system according to an embodiment of the present invention.

Another embodiment of the present invention provides support for CRM applications by supporting synchronization of customer "snapshots" from a CRM application to a second client. FIG. 14 illustrates one such embodiment. There a system 1400 includes a CRM client 1410, a second client 1420 and a synchronization agent 1430. Although not so limited, it may be convenient to think of the second client 1420 as a notebook computer, a tablet computer or some other mobile client that has intermittent access to the CRM client 1210.

The CRM client 1410 may include an application component 1412 and a database 1414 that stores customer related data. In addition to records representing activities, contacts, appointments and tasks as described above, conventional CRM applications store records representing customer sales, quotations, customer accounts and the like.

The synchronization agent 1430 may store a data set representing report templates that may be used for synchronization. Each template corresponds to a predetermined "snapshot," a summary report identifying status along a selected CRM dimension. Operators may selectively enable various templates for each client and may enable different sets of templates for different customers. During synchronization, a synchronization agent may engage the CRM client to collect summary data as dictated by the selected template and create snapshot files on the second client. For example, each template may be represented on a separate sheet of a spreadsheet file on the second client, each file representing a snapshot of an individual customer. Through use of the snapshot feature, an operator may generate summary data records from a CRM application that are amenable to mobile applications, among others.

Functionality of the foregoing embodiments may be provided on various computer platforms executing program instructions. Commonly, such computing platforms include one or more processors, a memory system and various input/output (I/O) devices. The processor may be any of a plurality of conventional processing systems, including microprocessors, digital signal processors and field programmable logic arrays. In some applications, it may be advantageous to provide multiple processors (not shown) in the platform. The processor(s) execute program instructions stored in the memory system. The memory system may include any combination of conventional memory circuits, including electrical, magnetic or optical memory systems. For example, the memory system may include read only memories, random access memories and bulk storage. The memory system not only stores the program instructions representing the various methods described herein but also can store the data items on which these methods operate. The I/O devices permit communication with external devices (not shown) and operators.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method for synchronizing data records among multiple clients, comprising:
   identifying data records from the clients that are candidates for synchronization,
   comparing content of a candidate record against a synchronization rule set, the synchronization rule set being specific to each of the multiple clients, and each rule set including a condition to which the content of the candidate record is compared and a response associated with the condition, wherein the comparing includes evaluating conditions built using Boolean operators and combinations of multiple fields of content in the data record, and
   if the comparison between the condition and the data record content generates a match, synchronizing the candidate record according to the synchronization rule set but the candidate record is not synchronized if the comparison does not generate a match,
   wherein when a conflict exists among copies of the candidate record stored by the multiple clients, the synchronizing comprises:
   displaying contents of the conflicting record copies on a field-by-field basis, based on operator input, selecting fields from among the displayed conflicting copies that are displayed as a final synchronization data record with the displayed contents of the conflicting record copies, generating a synchronization record from field data of the conflicting copies displayed as a final synchronization data record, and storing the synchronization record to at least one client.

2. The method of claim 1, wherein the synchronization rule set includes a client record as a condition.

3. The method of claim 1, wherein the synchronization rule set includes different rules for different clients.

4. A method for synchronizing data records among multiple clients, comprising:

determining whether a conflict exists among data records stored by multiple clients by comparing content of the common data records against a synchronization rule set, the synchronization rule set specific to each of the multiple clients, and each rule set including a condition to which the content of the common data record is compared and a response associated with the condition, the conflict arising because copies of a common data record stored on separate clients were revised independently of each other prior to synchronization, wherein the comparing includes evaluating conditions built using Boolean operators and combinations of multiple fields of content in the data record;

displaying contents of the conflicting record copies on a field-by-field basis, based on operator input, selecting fields from among the displayed copies that are displayed as a final synchronization data record with the displayed contents of the record copies, generating a synchronization record from the conflicting record copies displayed as the final synchronization data record, and storing the final synchronization data record to at least one client.

5. The method of claim 4, wherein a conflict is determined when copies of data records on different clients have different data.

6. The method for synchronizing data records among multiple clients of claim 4, comprising:

responsive to the operator input, identifying a data record currently being viewed by a first client, and synchronizing the currently viewed data record with a corresponding data record stored by a second client.

7. The method of claim 6, wherein no other records of the first client are synchronized in response to the operator command.

8. The method of claim 1, wherein the synchronization further comprises:

if a candidate record is incomplete, identifying a second record related to the candidate record, completing data of the candidate record using data from the second record, and synchronizing at least one client using the completed candidate the record.

9. The method of claim 8, wherein the second record is identified from an express link stored by the first record.

10. The method of claim 8, wherein the identifying comprises:

comparing data of the candidate record to corresponding data from other stored records, and selecting the second record based on a degree of similarity between the data of the candidate record and the second record.

11. The method of claim 8, further comprising, prior to the synchronizing, querying an operator for confirmation of the completed data.

12. The method of claim 8, wherein the second record is stored on a client different from the first record.

13. The method of claim 4, further comprising:

identifying task records from the clients that are candidates for synchronization, determining whether any of the candidate task records show that the task has been completed, synchronizing task records that have not been completed.

14. A method for synchronizing data records among multiple clients, comprising:

identifying data records from the clients that are candidates for synchronization, displaying with each of the identified data records a query to an operator to select/de-select each of the identified data records for inclusion in a synchronization operation, and responsive to the operator's selections, synchronizing selected records, wherein when a conflict exists among copies of the candidate record stored by the multiple clients, the synchronizing comprises:

displaying contents of the conflicting copies on a field-by-field basis, based on operator input, selecting fields from among the displayed conflicting copies that are displayed as a final synchronization data record with the displayed contents of the record copies, generating a synchronization record from field data of the conflicting copies displayed as the final synchronization data record, and storing the synchronization record to at least one client.

15. The method of claim 14, wherein de-selected records are excluded from synchronization.

16. The method of claim 6, wherein the data record currently being viewed by the first client is a currently-active data record at the first client.

17. The method of claim 4, wherein the final synchronization data record is unique in comparison to the conflicting records.

* * * * *